US011140585B2

(12) United States Patent
Xu et al.

(10) Patent No.: US 11,140,585 B2
(45) Date of Patent: *Oct. 5, 2021

(54) METHOD AND DEVICE FOR TRANSMITTING QOS FLOW TO DRB MAPPING RULE

(71) Applicant: LG Electronics Inc., Seoul (KR)

(72) Inventors: Jian Xu, Seoul (KR); Daewook Byun, Seoul (KR); Seokjung Kim, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,803

(22) Filed: Dec. 12, 2019

(65) Prior Publication Data

US 2020/0120558 A1    Apr. 16, 2020

Related U.S. Application Data

(63) Continuation of application No. 16/064,796, filed as application No. PCT/KR2018/000252 on Jan. 5, 2018, now Pat. No. 10,893,446.

(Continued)

(51) Int. Cl.
*H04W 36/00* (2009.01)
*H04W 24/10* (2009.01)
(Continued)

(52) U.S. Cl.
CPC ....... *H04W 36/0058* (2018.08); *H04W 24/10* (2013.01); *H04W 36/08* (2013.01); *H04W 36/22* (2013.01); *H04W 84/042* (2013.01)

(58) Field of Classification Search
CPC . H04W 24/10; H04W 36/00; H04W 36/0058; H04W 36/08; H04W 36/22; H04W 84/042
See application file for complete search history.

(56) References Cited

U.S. PATENT DOCUMENTS 8,514,809 B2    8/2013 Hwang et al.
8,638,753 B2    1/2014 Persson et al.
(Continued)

FOREIGN PATENT DOCUMENTS

CN    103096400 A    5/2013
CN    103098507 A    5/2013
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.6.0 (Dec. 2016).

(Continued)

*Primary Examiner* — Ahmed Elallam
(74) *Attorney, Agent, or Firm* — Dentons US LLP

(57) ABSTRACT

Provided are a method in which a source base station (BS) transmits a Quality of Service (QoS) flow-to-data radio bearer (DRB) mapping rule to a target BS in a wireless communication system, and a device supporting the same. The method may include: receiving, from a user equipment (UE), a measurement result of a target cell; determining the handover of the UE to the target BS on the basis of the measurement result; and transmitting, to the target BS, a handover request message including a QoS flow-to-DRB mapping rule of the source BS.

9 Claims, 18 Drawing Sheets

Related U.S. Application Data

(60) Provisional application No. 62/442,887, filed on Jan. 5, 2017, provisional application No. 62/442,483, filed on Jan. 5, 2017.

(51) Int. Cl.
*H04W 36/08* (2009.01)
*H04W 36/22* (2009.01)
*H04W 84/04* (2009.01)

(56) References Cited

U.S. PATENT DOCUMENTS

| | | | |
|---|---|---|---|
| 10,893,446 B2* | 1/2021 | Xu | H04W 36/00 |
| 10,966,222 B2* | 3/2021 | Han | H04W 24/10 |
| 10,993,138 B2* | 4/2021 | Van Der Velde | H04W 28/0268 |
| 2010/0103845 A1 | 4/2010 | Ulupinar et al. | |
| 2013/0017801 A1 | 1/2013 | Shaikh | |
| 2015/0124601 A1 | 5/2015 | Li et al. | |
| 2016/0353337 A1 | 12/2016 | Zhu | H04W 36/0055 |
| 2018/0160348 A1 | 6/2018 | Wu | H04W 76/27 |
| 2018/0242205 A1* | 8/2018 | Mildh | H04W 36/0055 |
| 2018/0317120 A1 | 11/2018 | Wang | H04W 76/11 |
| 2019/0075482 A1 | 3/2019 | Eriksson | H04W 28/0263 |
| 2019/0098544 A1* | 3/2019 | Han | H04W 72/1205 |
| 2019/0191348 A1 | 6/2019 | Futaki et al. | |
| 2019/0215735 A1* | 7/2019 | Wang | H04W 28/24 |
| 2019/0261240 A1 | 8/2019 | Fang | H04W 28/0268 |
| 2019/0327656 A1* | 10/2019 | Han | H04W 36/0044 |
| 2019/0349803 A1 | 11/2019 | Byun et al. | |
| 2019/0357075 A1* | 11/2019 | Van Der Velde | H04W 28/0268 |
| 2020/0128452 A1* | 4/2020 | Centonza | H04W 36/0044 |

FOREIGN PATENT DOCUMENTS

| | | |
|---|---|---|
| CN | 104363598 A | 2/2015 |
| CN | 104796954 A | 7/2015 |
| CN | 104798392 A | 7/2015 |
| CN | 106034314 A | 10/2016 |
| EP | 3051876 | 8/2015 |
| EP | 3024266 | 5/2016 |
| JP | 2015530019 A | 10/2015 |
| JP | 2018-093493 A | 6/2018 |
| JP | 2018093493 A | 6/2018 |
| RU | 2600456 C1 | 10/2016 |
| WO | 2014/021761 A2 | 2/2014 |
| WO | 2014031998 A1 | 2/2014 |
| WO | 2014133651 A1 | 9/2014 |
| WO | 2014148749 A1 | 9/2014 |
| WO | 2015002404 | 1/2015 |
| WO | 2015160329 A1 | 10/2015 |
| WO | 2015182627 | 12/2015 |
| WO | 2016003805 A1 | 1/2016 |

OTHER PUBLICATIONS

Samsung, "QoS handling of offloaded bearer in LWA", 3GPP TSG-RAN2 Meeting #91bis, Oct. 5-9, 2015, R2-154371.
NTT DoCoMo, Inc., "QoS and bearer for DC between LTE and NR", 3GPP TSG-RAN2 #96, Nov. 14-18, 2016, R2-168400.
Huawei, "QoS considerations in Handover procedure", 3GPP TSG-RAN3 Meeting #94, Nov. 14-18, 2016, R3-162958.
R2-167835: 3GPP TSG-RAN WG2 Meeting #86, Reno, USA, Nov. 14-18, 2016, ZTE, ZTE Microelectronics, "Consideration on the inter-RAT mobility," (4 Pages).
R2-134103: 3GPP TSG RAN WG2 Meeting #84, San Francisco, USA, Nov. 11-15, 2013, "Discussions on System Information Exchange between MeNB and SeNB for data offload," Blackberry UK Limited, (3 Pages).
R2-1701205 (revision of R2-1700088): 3GPP TSG-RAN2 Meeting #97, Athens, Greece, Feb. 13-17, 2017, "QoS Flow to DRB Mapping," Huawei,HiSilcon, (6 Pages).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.0.0 (Jun. 2016).
3GPP TSG-RAN WG2 Meeting #96 Tdoc R2-168657 Reno, Nevada, USA, Nov. 14-18, 2016.6 pp. 1-6.

* cited by examiner

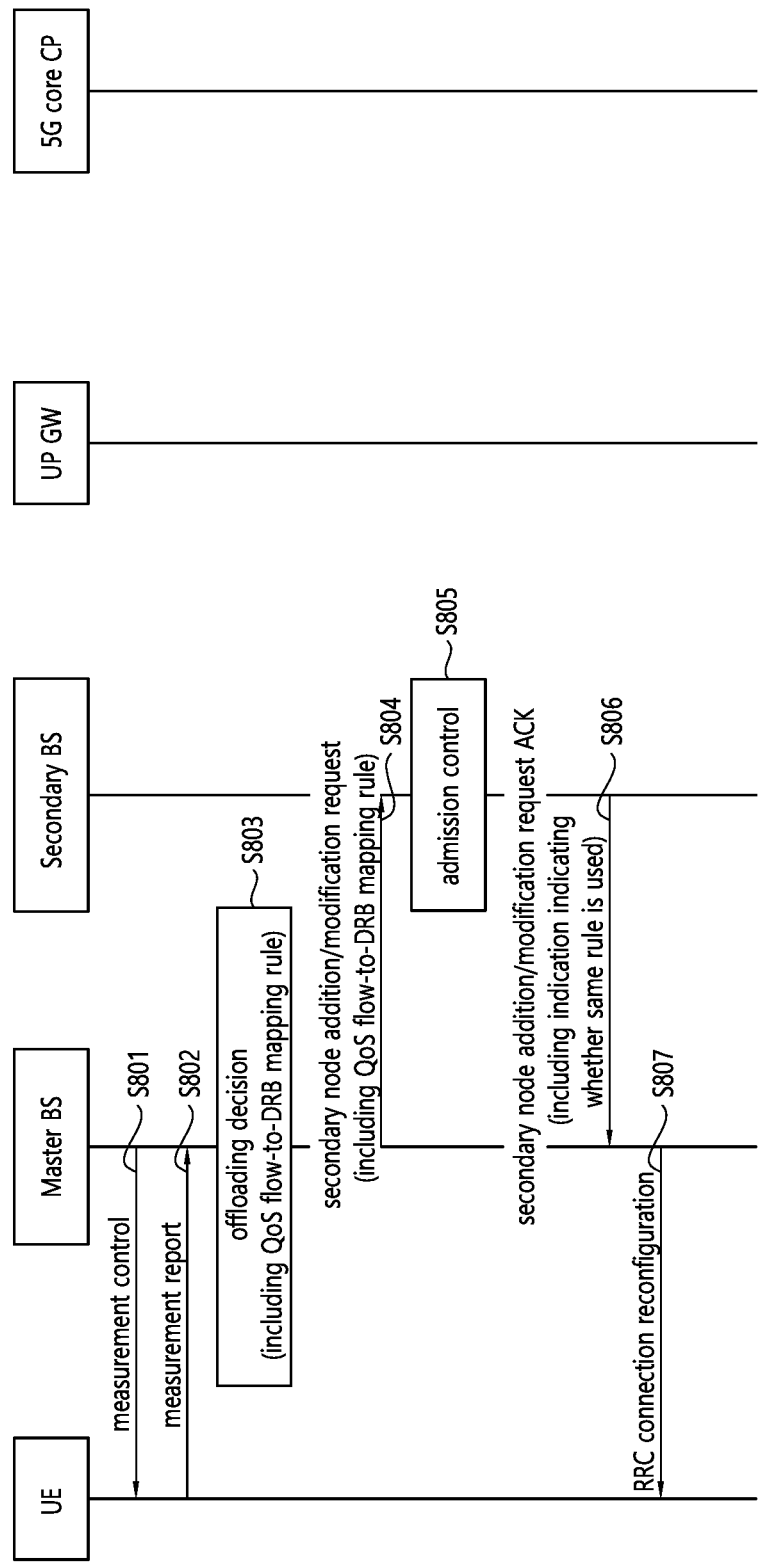

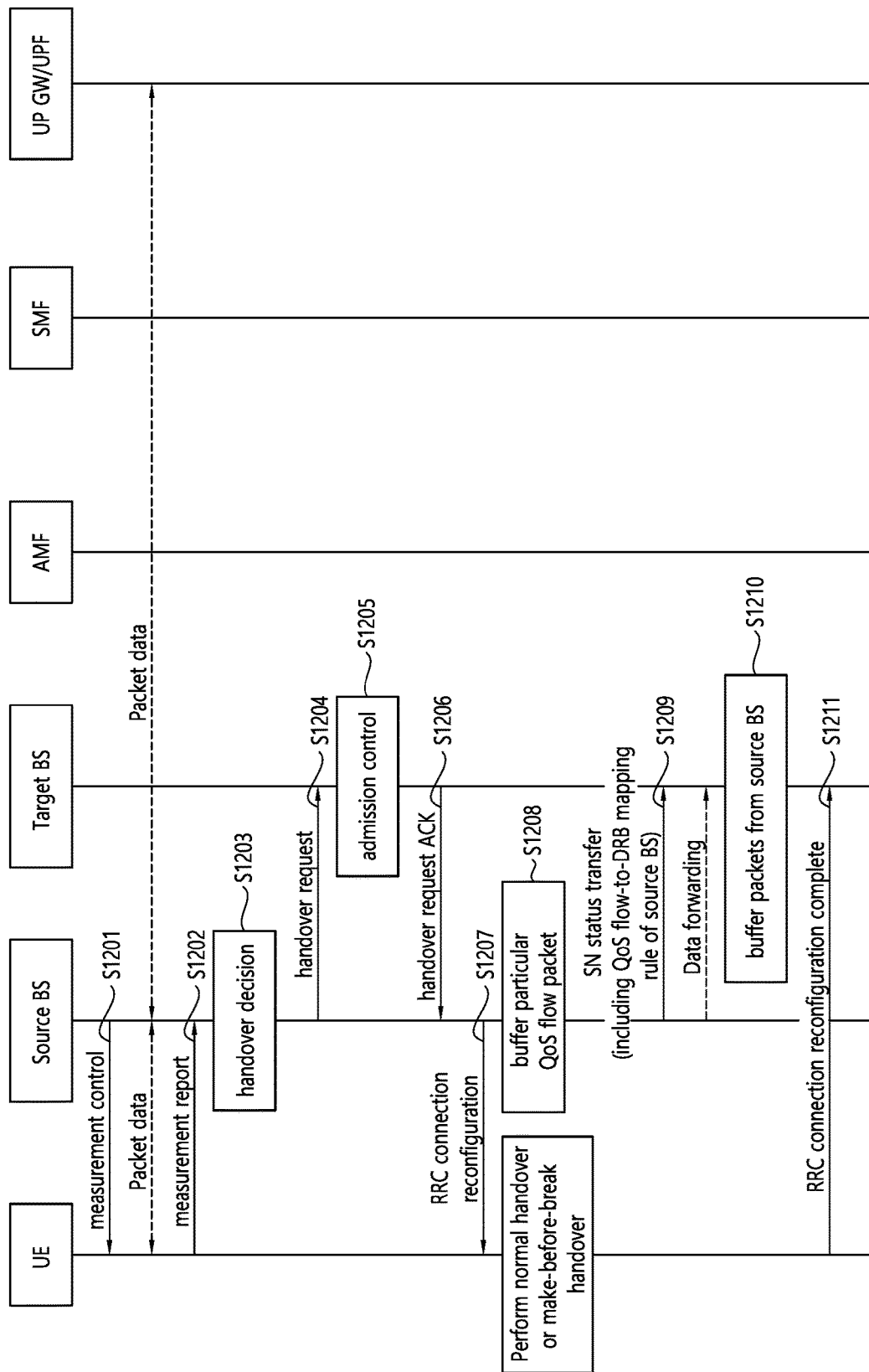

METHOD AND DEVICE FOR TRANSMITTING QOS FLOW TO DRB MAPPING RULE

CROSS-REFERENCE TO RELATED APPLICATIONS

This application is a Continuation of U.S. patent application Ser. No. 16/064,796, filed on Jun. 21, 2018, which is the National Stage filing under 35 U.S.C. 371 of International Application No. PCT/KR2018/000252, filed on Jan. 5, 2018, which claims the benefit of U.S. Provisional Applications No. 62/442,887 filed on Jan. 5, 2017, and No. 62/442,483 filed on Jan. 5, 2017, the contents of which are all hereby incorporated by reference herein in their entirety.

BACKGROUND OF THE INVENTION

Field of the Invention

The present invention relates to a wireless communication system and, more particularly, to a method for transmitting, by a base station, a rule for Quality of Service (QoS) flow-to-data radio bearer (DRB) mapping, and a device supporting the same.

Related Art

Quality of Service (QoS) refers to technology for smoothly transmitting various types of traffic (mail, data transmission, sounds, or images) to end users depending on the characteristics thereof. The most fundamental QoS parameter is a bandwidth, a cell transfer delay (CTD), a cell delay variation (CDV), or a cell loss ratio (CLR).

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE INVENTION

With the introduction of the concept of a QoS flow for data packet transmission between a 5G core network and a new RAN, a rule for mapping a QoS flow to a DRB is required. However, a base station (BS) cannot know a QoS flow-to-DRB mapping rule for a neighboring BS. Thus, for example, when a user equipment (UE) is handed over from the BS to the neighboring BS, the neighboring BS cannot determine which QoS flow-to-DRB mapping rule the neighboring BS needs to apply to the UE. When BSs have different QoS flow-to-DRB mapping rules, for example, a target BS may not correctly transmit, to a UE, a packet forwarded from a source BS. Therefore, QoS flow-to-DRB mapping rules need to be shared between BSs.

One embodiment provides a method for transmitting, by a source base station, a rule for Quality of Service (QoS) flow-to-data radio bearer (DRB) mapping to a target base station in a wireless communication system. The method may include: receiving, from a user equipment (UE), a measurement result of a target cell; determining a handover of the UE to the target base station, based on the measurement result; and transmitting, to the target base station, a handover request message including the rule for QoS flow-to-DRB mapping of the source base station.

Another embodiment provides a method for transmitting, by a master base station, a rule for Quality of Service (QoS) flow-to-data radio bearer (DRB) mapping to a secondary base station in a wireless communication system. The method may include: receiving, from a user equipment (UE), a measurement result of the secondary base station; determining a data offloading to the secondary base station, based on the measurement result; and transmitting, to the secondary base station, the rule for QoS flow-to-DRB mapping of the master base station.

Another embodiment provides a source base station for transmitting a rule for Quality of Service (QoS) flow-to-data radio bearer (DRB) mapping to a target base station in a wireless communication system. The source base station may include a memory; a transceiver; and a processor, connected with the memory and the transceiver, that: controls the transceiver to receive, from a user equipment (UE), a measurement result of a target cell; determines a handover of the UE to the target base station, based on the measurement result; and controls the transceiver to transmit, to the target base station, a handover request message including the rule for QoS flow-to-DRB mapping of the source base station.

A rule for QoS flow-to-DRB mapping can be shared between base stations.

BRIEF DESCRIPTION OF THE DRAWINGS

FIGS. 8A and 8B show a procedure for forwarding a QoS flow-to-DRB mapping rule in an offloading procedure according to an embodiment of the present invention.

FIGS. 12A and 12B show a procedure for forwarding a QoS flow packet in a handover procedure according to an embodiment of the present invention.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
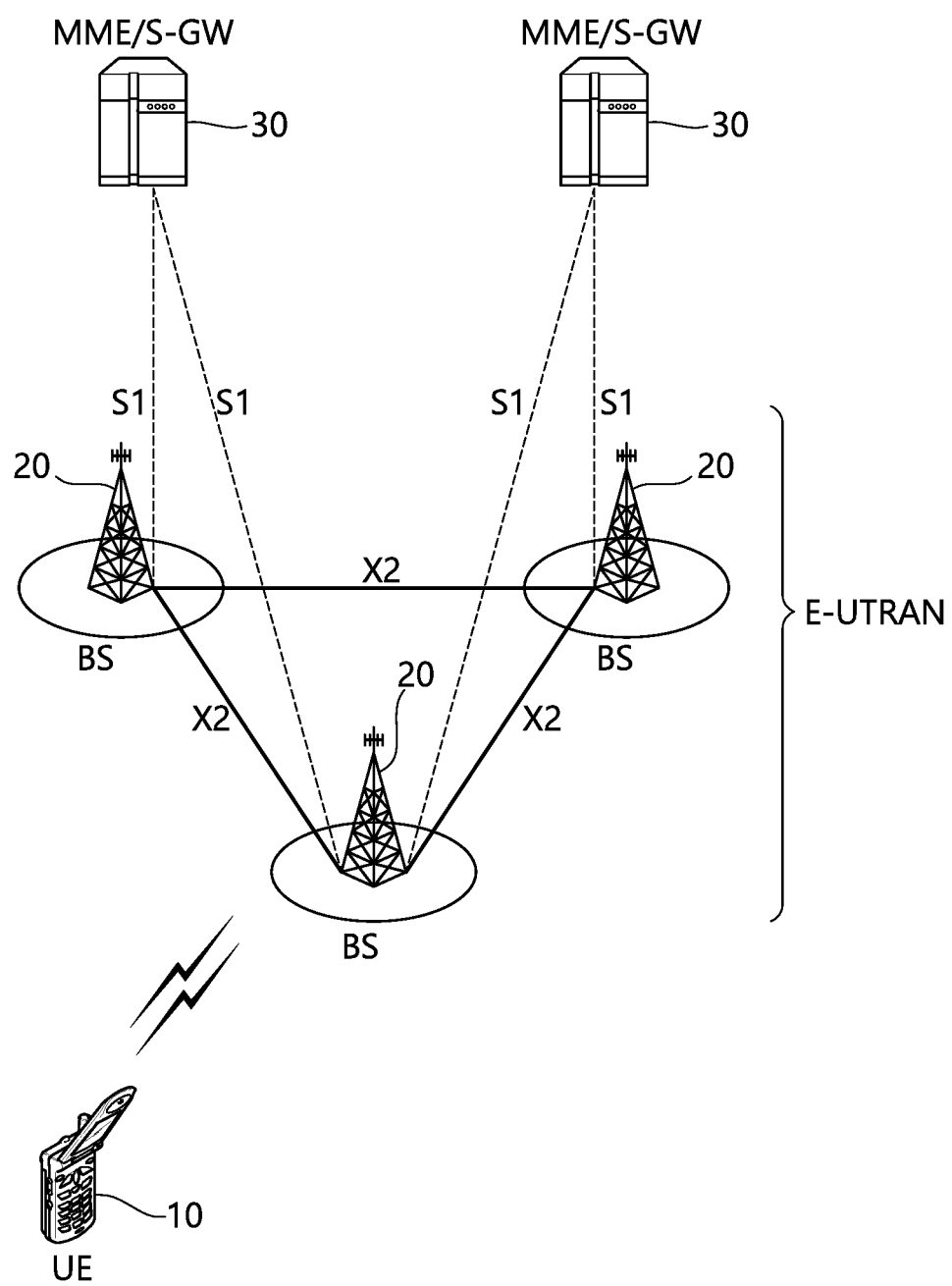
FIG. 1 shows an LTE system architecture.

FIG. 1 shows an LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
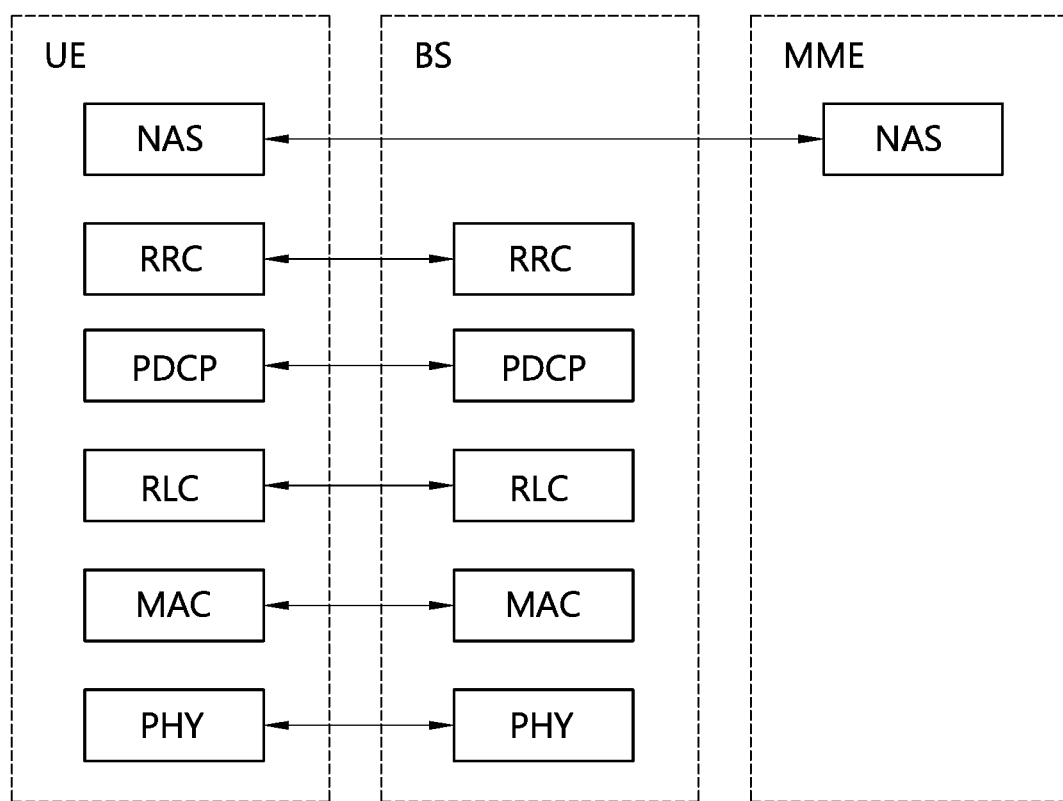
FIG. 2 shows a control plane of a radio interface protocol of an LTE system.
Figure 3:
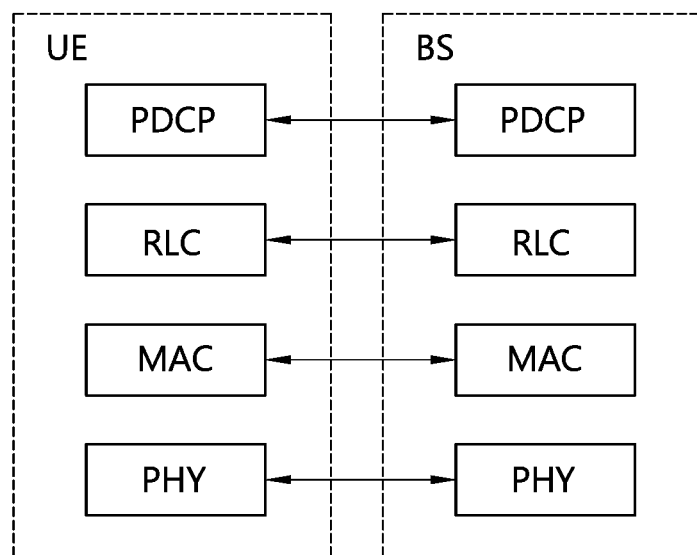
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network architecture will be described.

Figure 4:
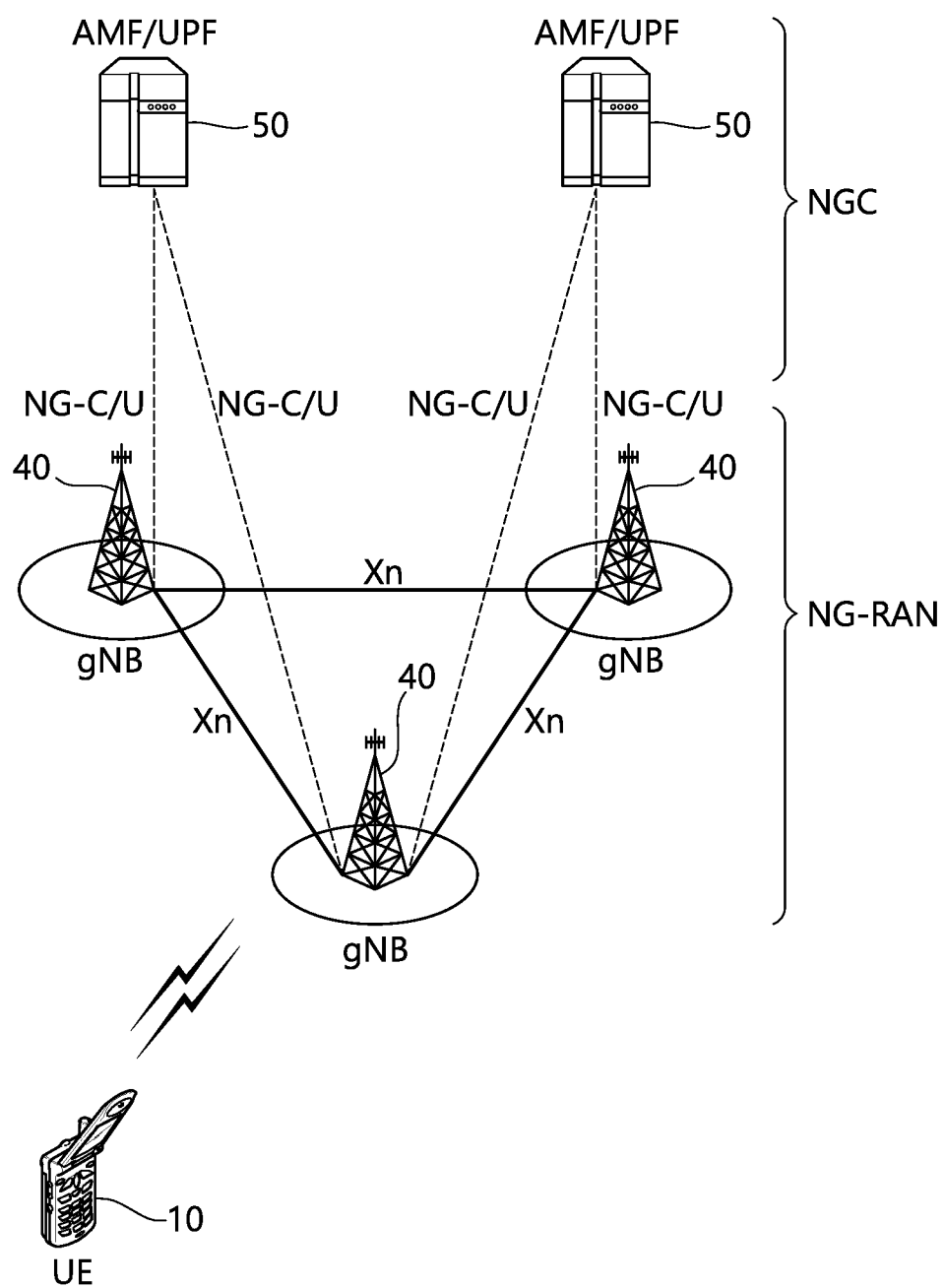
FIG. 4 shows a 5G system architecture.

FIG. 4 shows a 5G system architecture.

In evolved packet core (EPC), which is the core network architecture of the existing evolved packet system (EPS), functions, reference points, and protocols are defined for each entity, such as a mobility management entity (MME), a serving gateway (S-GW), and a packet data network gateway (P-GW).

In a 5G core network (or NextGen core network), however, functions, reference points, and protocols are defined for each network function (NF). That is, in the 5G core network, functions, reference points, and protocols are not defined for each entity.

Referring to FIG. 4, the 5G system architecture includes one or more UEs 10, a next-generation radio access network (NG-RAN), and a next-generation core (NGC).

The NG-RAN may include one or more gNBs 40, and a plurality of UEs may exist in one cell. The gNB 40 provides an end point of a control plane and a user plane to a UE. The gNB 40 generally refers to a fixed station that communicates with the UE 10 and may be referred to by another term, such as a base station (BS), a base transceiver system (BTS), or an access point. One gNB 40 may be deployed per cell. There may be one or more cells in the coverage of the gNB 40.

The NGC may include an access and mobility function (AMF) and a session management function (SMF) which are in charge of control plane functions. The AMF may be responsible for a mobility management function, and SMF may be responsible for a session management functions. The NGC may include a user plane function (UPF) which is in charge of user plane functions.

An interface for user traffic transmission or control traffic transmission may be used. The UE 10 and the gNB 40 may be connected via an NG3 interface. The gNBs 40 may be connected with each other via an Xn interface. Neighboring gNBs 40 may form a mesh network structure via the Xn interface. The gNBs 40 may be connected to the NGC via an NG interface. The gNBs 40 may be connected to the AMF by an NG-C interface and may be connected to the UPF via an NG-U interface. The NG interface supports many-to-many-relations between the gNBs 40 and the MME/UPF 50.

A gNB host may perform functions for radio resource management, IP header compression and user data stream encryption, selection of an AMF at UE attachment when no routing to an AMF can be determined from information provided by a UE, routing of user plane data towards one or more UPFs, scheduling and transmission of a paging message (originating from an AMF), scheduling and transmission of system broadcast information (originating from an AMF or O&M), or measurement and measurement reporting configuration for mobility and scheduling.

An AMF host may perform primary functions, such as NAS signaling termination, NAS signaling security, AS security control, inter-CN signaling for mobility between 3GPP access networks, idle-mode UE reachability (including control and execution of paging retransmission), tracking area list management for UEs in idel and active modes, AMF selection for handovers with an AMF change), access authentication, and access authorization including check for roaming rights.

An UPF host may perform primary functions, such as an anchor point for intra/inter-RAT mobility (when applicable), an external PDU session point for interconnection to a data network, packet routing and forwarding, packet inspection and user plane part of policy rule enforcement, traffic usage reporting, an uplink classifier to support routing traffic flows to a data network, a branching point to support a multi-homing PDU session, QoS handling for a user plane, for example, packet filtering, gating, and UL/DL rate enforcement, uplink traffic verification (SDF to QoS flow mapping), transport level packet marking in an uplink and a downlink, or downlink packet buffering and downlink data notification triggering.

An SMF host may perform primary functions, such as session management, UE IP address allocation and management, selection and control of a UP function, traffic steering configuration by a UPF to route traffic to a proper destination, control of part of QoS and policy enforcement, or downlink data notification.

Figure 5:
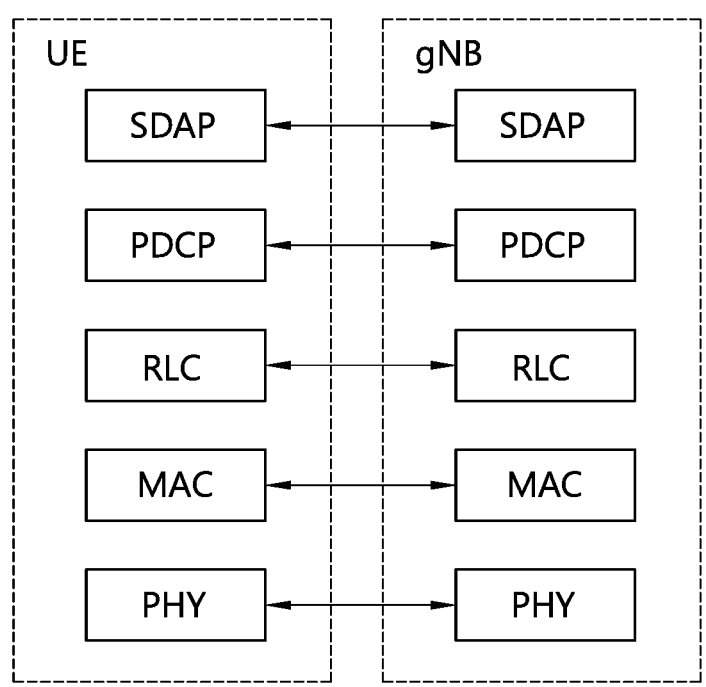
FIG. 5 shows a wireless interface protocol of a 5G system for a user plane.

FIG. 5 shows a wireless interface protocol of a 5G system for a user plane.

Referring to FIG. 5, the wireless interface protocol of the 5G system for the user plane may include a new layer, which is a service data adaptation protocol (SDAP), as compared with an LTE system. The main services and functions of the SDAP layer are mapping between a QoS flow and a data radio bearer (DRB) and marking of a QoS flow ID (QFI) in both uplink and downlink packets. A single protocol entity of the SDAP may be configured for each individual PDU session, except for dual connectivity (DC) where two entities can be configured.

Figure 6:
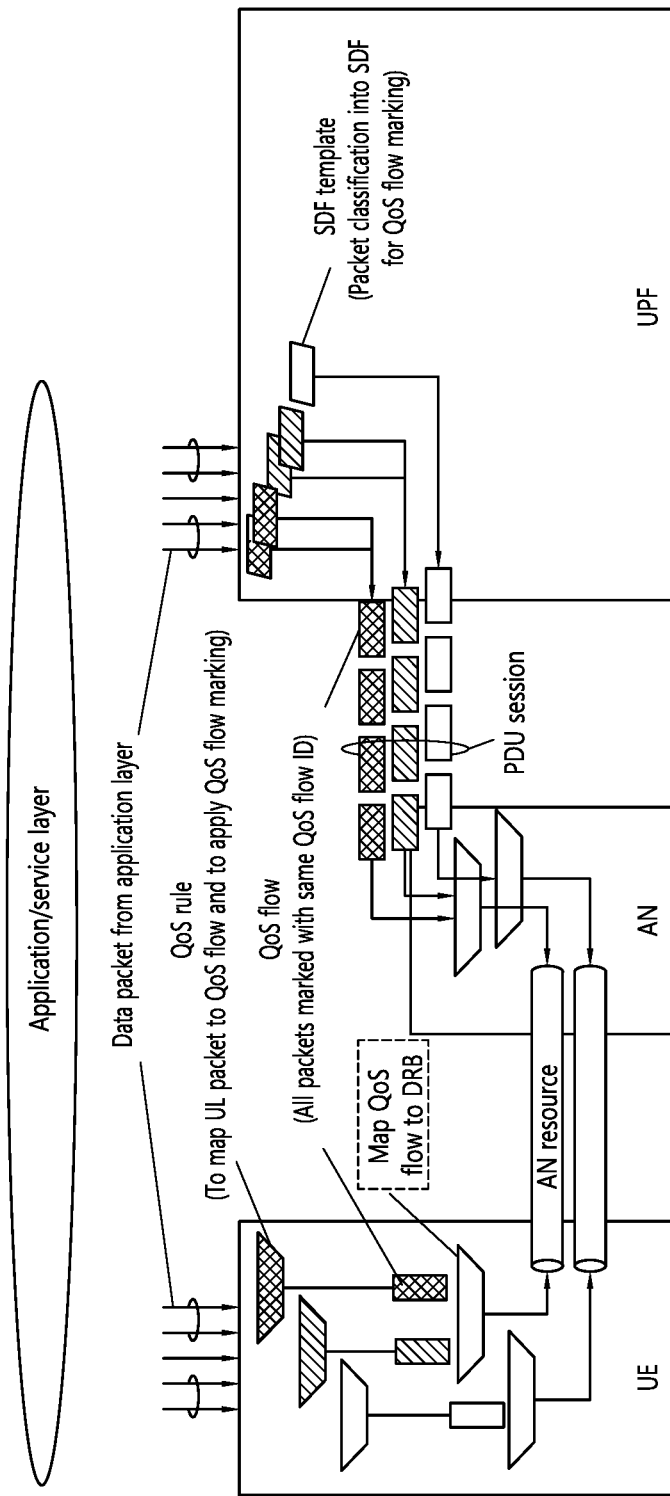
FIG. 6 shows mapping between a QoS flow and a DRB.

FIG. 6 shows mapping between a QoS flow and a DRB.

In an uplink, a BS may control mapping of a QoS flow to a DRB using either reflective mapping or explicit configuration. In reflection mapping, for each DRB, a UE may monitor a QoS flow ID in a downlink packet and may apply the same mapping in an uplink. To enable reflective mapping, the BS may mark the downlink packet via a Uu with the QoS flow ID. In explicit configuration, however, the BS may configure QoS flow-to-DRB mapping. In this specification, QoS flow-to-DRB mapping may be conceptually equivalent to flow-to-DRB mapping or QoS flow ID-to-DRB mapping.

In a legacy LTE-based system, an EPS bearer or E-RAB may be mapped to a DRB one to one. This mapping is based on the concept of bearer in a wireless interface and a core network. In addition, a one-to-one mapping principle may be applied to all nodes in a network. According to the 5G system, the concept of a QoS flow is introduced for data packet transmission between a 5G core network and a new RAN. However, the concept of DRB is still maintained in a Uu interface between the new RAN and a UE. Thus, a rule may be needed to map a QoS flow to a DRB. That is, a QoS flow-to-DRB mapping rule may be required to map a particular flow to a particular DRB.

Currently, a BS cannot know a QoS flow-to-DRB mapping rule for a neighboring BS. Accordingly, when a UE is handed over from the BS to the neighboring BS, the neighboring BS cannot determine which QoS flow-to-DRB mapping rule the neighboring BS needs to apply to the UE. Alternatively, when a packet for the UE is offloaded onto the neighboring BS, the neighboring BS cannot know which QoS flow-to-DRB mapping rule the neighboring BS needs to apply to the offloaded packet. QoS flow-to-DRB mapping rules for different nodes may be the same or different in the handover of a UE or in packet offloading onto another node, and handover/offloading delays or packet loss may be caused by such mapping rules. For example, during a handover between a source BS and a target BS, the target BS needs to immediately transmit a packet forwarded from the source BS to a UE. However, when the source BS and the target BS have different QoS flow-to-DRB mapping rules, the target BS may not correctly transmit, to the UE, the packet forwarded from the source BS. Alternatively, when the source BS and the target BS have different QoS flow-to-DRB mapping rules, the target BS may transmit the packet forwarded from the source BS to another UE. That is, the forwarded packet may be transmitted to the UE or the other UE via an incorrect DRB. To solve this problem, the QoS flow-to-DRB mapping rules need to be shared between the BSs. Hereinafter, a method for transmitting a QoS flow-to-DRB mapping rule and a device supporting the same will be described according to an embodiment of the present invention.

Figure 7:
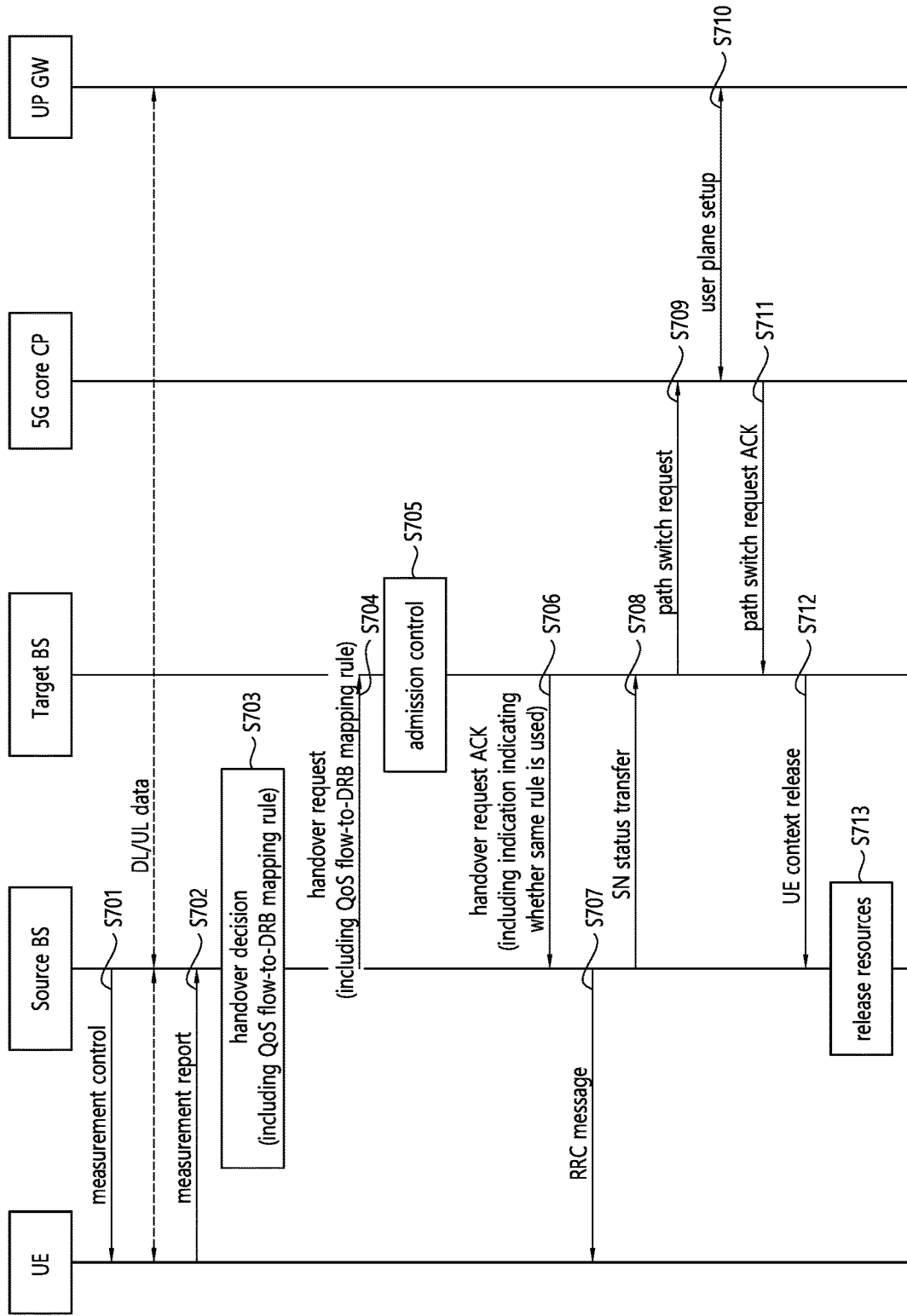
FIG. 7 shows a procedure for forwarding a QoS flow-to-DRB mapping rule in a handover procedure according to an embodiment of the present invention.

FIG. 7 shows a procedure for forwarding a QoS flow-to-DRB mapping rule in a handover procedure according to an embodiment of the present invention.

Referring to FIG. 7, in step S701, a source BS may configure a UE measurement procedure according to area restriction information. The source BS may be a gNB or an enhanced eNB. The source BS may configure a UE to perform measurement in a beam level.

In step S702, the UE may measure a target cell as configured in system information. The UE may then process a measurement report. The UE may send the measurement report to the source BS.

In step S703, using the measurement report, the source BS may determine to trigger a handover procedure. In addition, the source BS may determine to include a QoS flow-to-DRB mapping rule of the source BS in the target BS. The target BS may be a gNB or an enhanced eNB. The QoS flow may have a QoS profile.

In step S704, the source BS may initiate the handover procedure to the target BS. The handover procedure may be initiated by sending a handover request message including the QoS flow-to-DRB mapping rule to the target BS. Additionally, the handover request message may include other necessary parameters. The QoS flow may have a QoS profile.

In step S705, admission control may be performed by the target BS on PDU session connection sent from the source BS on the basis of QoS. When the target BS maps a QoS flow to a DRB at the side of the target BS, the received QoS flow-to-DRB mapping rule may be considered by the target BS, which may help user experience during the mobility of the UE. The QoS flow may have a QoS profile.

In step S706, the target BS may prepare for an L1/L2 handover. The target BS may sends a handover request acknowledgment (ACK) message to the source BS. The handover request ACK message may notify the source BS whether the same or similar QoS flow-to-DRB mapping rule is used. A specific indication may be used to report whether the same or similar QoS flow-to-DRB mapping rule is used for the target BS. When the source BS receives the specific indication, the source BS may determine how to handle a data packet, such as data forwarding. This information may be a reference for the source BS to determine whether to hand over the UE.

In step S707, the source BS may send a handover command to the UE. Then, the UE may access the target cell.

In step S708, the source BS may send an SN status transfer message to the target BS. The SN status transfer message may be sent for data forwarding.

In step S709, the target BS may send a path switch request message to a 5G core CP. The path switch request message may be sent to report that the UE has changed a cell including PDU session context to be switched. A downlink ID and a BS address for a PDU session may be included in the PDU session context.

In step S710, the 5G core CP may establish a user plane path for the PDU session in a core network. The downlink ID and the BS address for the PDU session may be sent to a user plane gateway (UPGW).

In step S711, the 5G core CP may send a path switch ACK message to the target BS.

In step S712, the target BS may send a UE context release (UE context release) message, thereby notifying the source BS of the success of the handover. The target BS may then trigger the release of resources by the source BS.

In step S713, upon receiving the UE context release message, the source BS may release radio and control plane-related resources associated with UE context. Any ongoing data forwarding may continue.

According to the proposed embodiment of the present invention, with a new QoS flow concept in a 5G core and a 5G new RAN, it is possible to improve UE's experience, such as smooth handover or service continuity on data packets, and to facilitate an RAN node to handle data packets better for a specific UE during a handover.

Figure 8B:
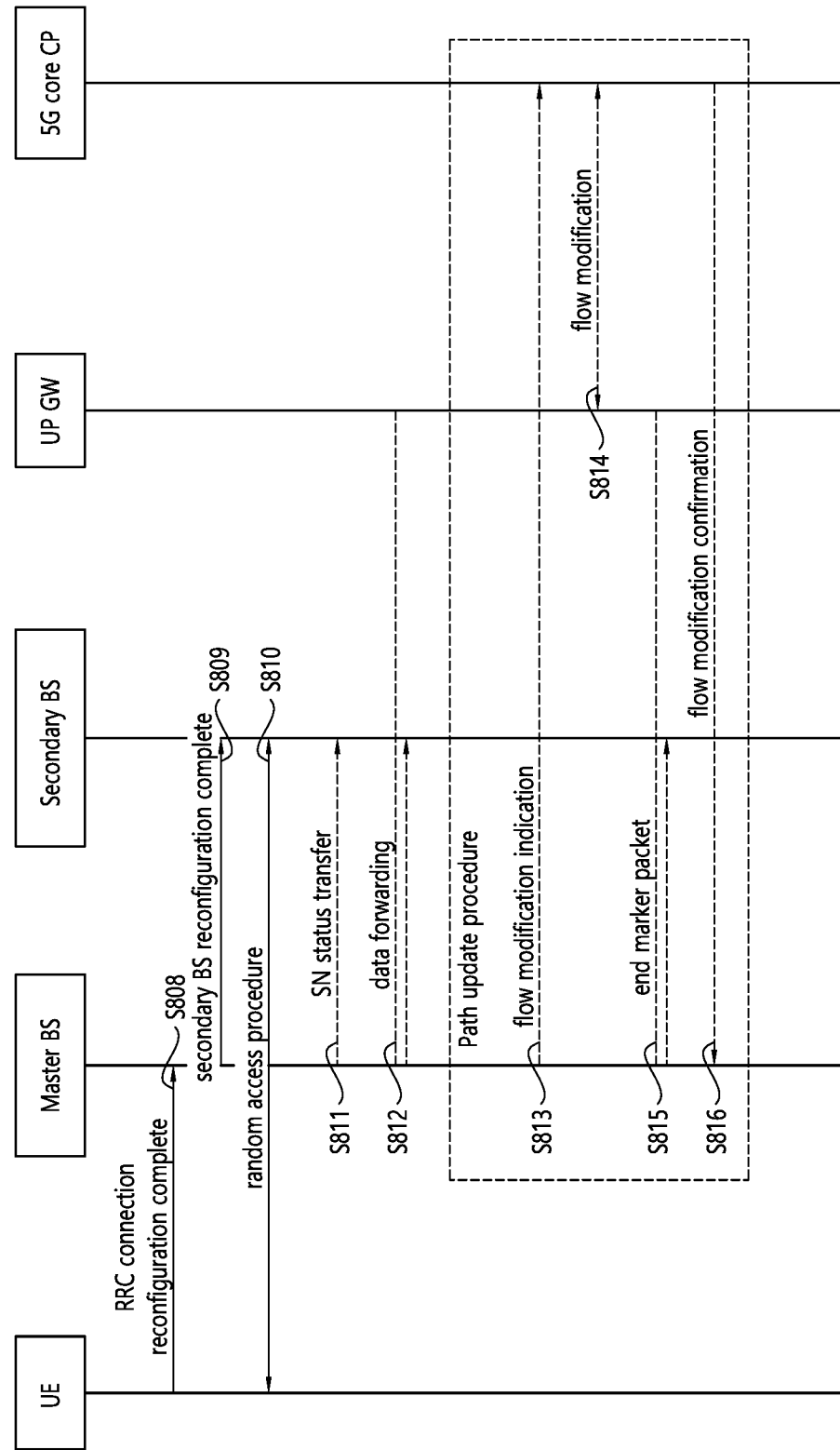

FIGS. 8A and 8B show a procedure for forwarding a QoS flow-to-DRB mapping rule in an offloading procedure according to an embodiment of the present invention.

Referring to FIG. 8A, in step S801, a master BS may configure a UE measurement procedure according to area restriction information. The master BS may be a gNB or an enhanced eNB. The master BS may have dual connectivity with one secondary BS and may also have multiple connectivity with two or more secondary BSs. The secondary BS may be a gNB or an enhanced eNB.

In step S802, the UE may measure a target cell as configured in system information. The UE may then process a measurement report. The UE may send the measurement report to the source BS.

In step S803, using the measurement report, the master BS may determine to request the secondary BS to allocate radio resources for specific flow(s). Also, the master BS may determine to include a QoS flow-to-DRB mapping rule of the master BS in the secondary BS. The QoS flow may have a QoS profile.

In step S804, the master BS may transmit the QoS flow-to-DRB mapping rule to the secondary BS. The QoS flow-to-DRB mapping rule may be included in a secondary node addition request message or a secondary node modification request message. Additionally, the secondary node addition request message or the secondary node modification request message may include other necessary parameters. The QoS flow may have a QoS profile.

In step S805, admission control may be performed by the secondary BS on PDU session connection sent from the master BS on the basis of QoS. When the secondary BS maps a QoS flow to a DRB at the side of the secondary BS, the received QoS flow-to-DRB mapping rule may be considered by the secondary BS, which may help user experience during the mobility of the UE. The QoS flow may have a QoS profile.

In step S806, when an RRM entity in the secondary node is able to admit the resource request, the secondary BS sends the secondary node addition ACK message or a secondary node modification ACK message to the master BS. The secondary node addition ACK message or the secondary node modification ACK message may notify the master BS whether the same or similar QoS flow-to-DRB mapping rule is used. A specific indication may be used to report whether the same or similar QoS flow-to-DRB mapping rule is used for the secondary BS. When the master BS receives the specific indication, the master BS may determine how to handle a data packet, such as data forwarding. This information may be a reference for the master BS to determine whether to offload the QoS flow.

In step S807, the master BS may send a handover command to the UE.

Steps S808 to S816 illustrated in FIG. 8B are similar to the legacy dual connectivity procedure, and thus a detailed description will be omitted.

According to the proposed embodiment of the present invention, with a new QoS flow concept in a 5G core and a 5G new RAN, it is possible to improve UE's experience, such as smooth data packet offloading from a master node or service continuity on data packets, and to facilitate an RAN node to handle data packets better for a specific UE during an offloading procedures in dual connectivity or multiple connectivity.

Figure 9:
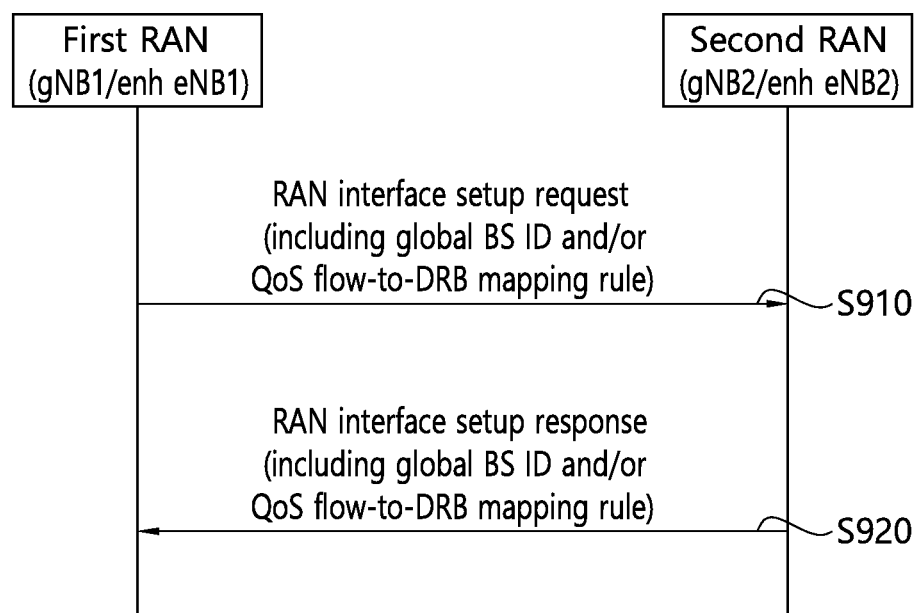
FIG. 9 shows a procedure for forwarding a QoS flow-to-DRB mapping rule in an Xn interface setup procedure according to an embodiment of the present invention.

FIG. 9 shows a procedure for forwarding a QoS flow-to-DRB mapping rule in an Xn interface setup procedure according to an embodiment of the present invention.

A QoS flow-to-DRB mapping rule may be exchanged between RANs when an RAN interface (e.g., Xn interface) is set up.

Referring to FIG. 9, in step S910, a first RAN may send an RAN interface setup request message to a second RAN. The RAN interface setup request message may include a QoS flow-to-DRB mapping rule of the first RAN. Further, the RAN interface setup request message may include the global ID of the first RAN. The first RAN may be a gNB or an enhanced eNB. When a neighboring RAN node needs to use the same rule as the QoS flow-to-DRB mapping rule of the first RAN, the QoS flow-to-DRB mapping rule of the first RAN may be transmitted to the neighboring RAN node.

In step S920, upon receiving the QoS flow-to-DRB mapping rule of the first RAN, the second RAN may take the QoS flow-to-DRB mapping rule of the first RAN into account for a UE-specific procedure for handling a data packet. For example, the UE-specific procedure for handling the data packet may be a mobility procedure or data forwarding. Subsequently, the second RAN may send an RAN interface setup response message to the first RAN. The RAN interface setup response message may include a QoS flow-to-DRB mapping rule of the second RAN. Further, the RAN interface setup response message may include the global ID of the second RAN. The second RAN may be a gNB or an enhanced eNB.

Next, the first RAN may perform an appropriate operation on the basis of the received parameter for the UE-specific procedure for handling the data packet on the side of the first RAN.

According to the proposed embodiment of the present invention, with a new QoS flow concept in a 5G core and a 5G new RAN, it is possible to improve UE's experience, such as smooth data packet offloading from a master node, smooth handover, or service continuity on data packets, and to facilitate an RAN node to handle data packets better for a specific UE during an offloading procedures in dual connectivity or multiple connectivity or during handover.

Figure 10:
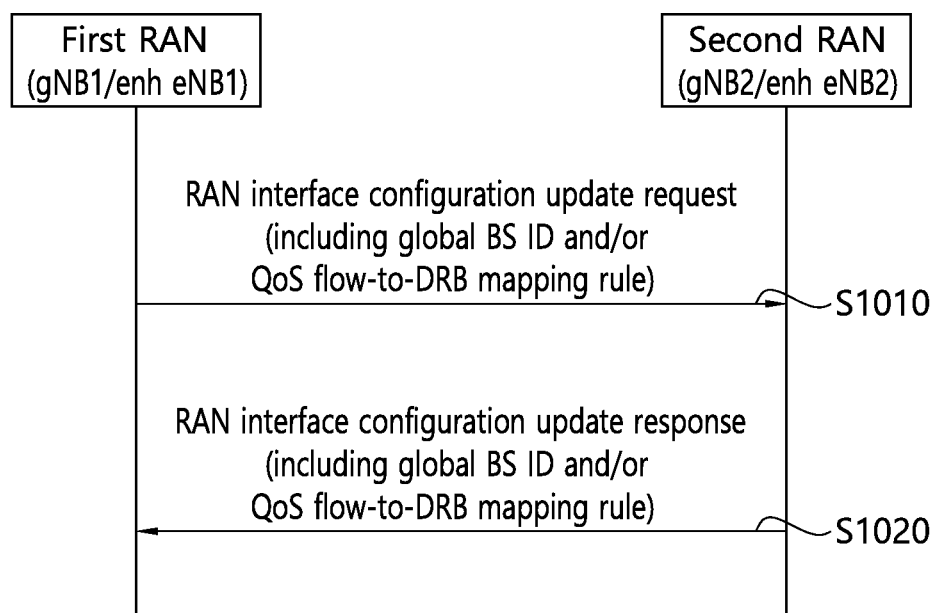
FIG. 10 shows a procedure for forwarding a QoS flow-to-DRB mapping rule in an Xn interface configuration update procedure according to an embodiment of the present invention.

FIG. 10 shows a procedure for forwarding a QoS flow-to-DRB mapping rule in an Xn interface configuration update procedure according to an embodiment of the present invention.

A QoS flow-to-DRB mapping rule may be exchanged between RANs when an RAN interface (e.g., Xn interface) configuration is updated.

Referring to FIG. 10, in step S1010, a first RAN may send an RAN interface configuration update request message to a second RAN. The RAN interface configuration update request message may include an updated QoS flow-to-DRB mapping rule of the first RAN. Further, the RAN interface configuration update request message may include the global ID of the first RAN. The first RAN may be a gNB or an enhanced eNB. When the first RAN updates the QoS flow-to-DRB mapping rule of the first RAN, the updated QoS flow-to-DRB mapping rule of the first RAN may be transmitted to a neighboring RAN node.

In step S1020, upon receiving the updated QoS flow-to-DRB mapping rule of the first RAN, the second RAN may take the updated QoS flow-to-DRB mapping rule of the first RAN into account for a UE-specific procedure for handling a data packet. For example, the UE-specific procedure for handling the data packet may be a mobility procedure or data forwarding. Subsequently, the second RAN may send an RAN interface configuration update response message to the first RAN. The RAN interface configuration update response message may include a QoS flow-to-DRB mapping rule of the second RAN. Alternatively, the RAN interface configuration update response message may include an updated QoS flow-to-DRB mapping rule of the second RAN. Further, the RAN interface configuration update response message may include the global ID of the second RAN. The second RAN may be a gNB or an enhanced eNB.

Next, the first RAN may perform an appropriate operation on the basis of the received parameter for the UE-specific procedure for handling the data packet on the side of the first RAN.

According to the proposed embodiment of the present invention, with a new QoS flow concept in a 5G core and a 5G new RAN, it is possible to improve UE's experience, such as smooth data packet offloading from a master node, smooth handover, or service continuity on data packets, and to facilitate an RAN node to handle data packets better for a specific UE during an offloading procedures in dual connectivity or multiple connectivity or during handover.

Figure 11A:
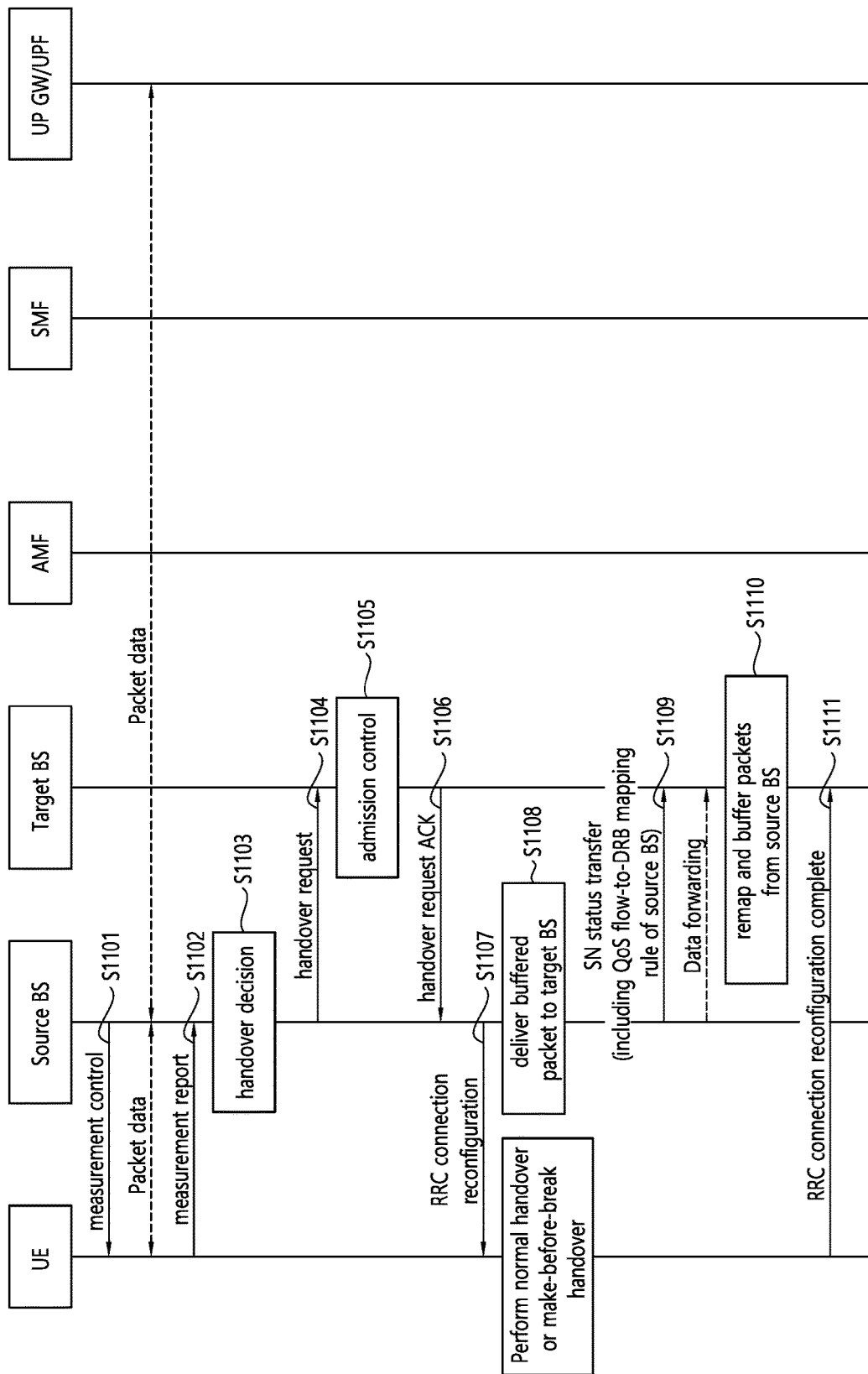
FIGS. 11A and 11B show a procedure for forwarding a QoS flow-to-DRB mapping rule in a handover procedure according to an embodiment of the present invention.
Figure 11B:
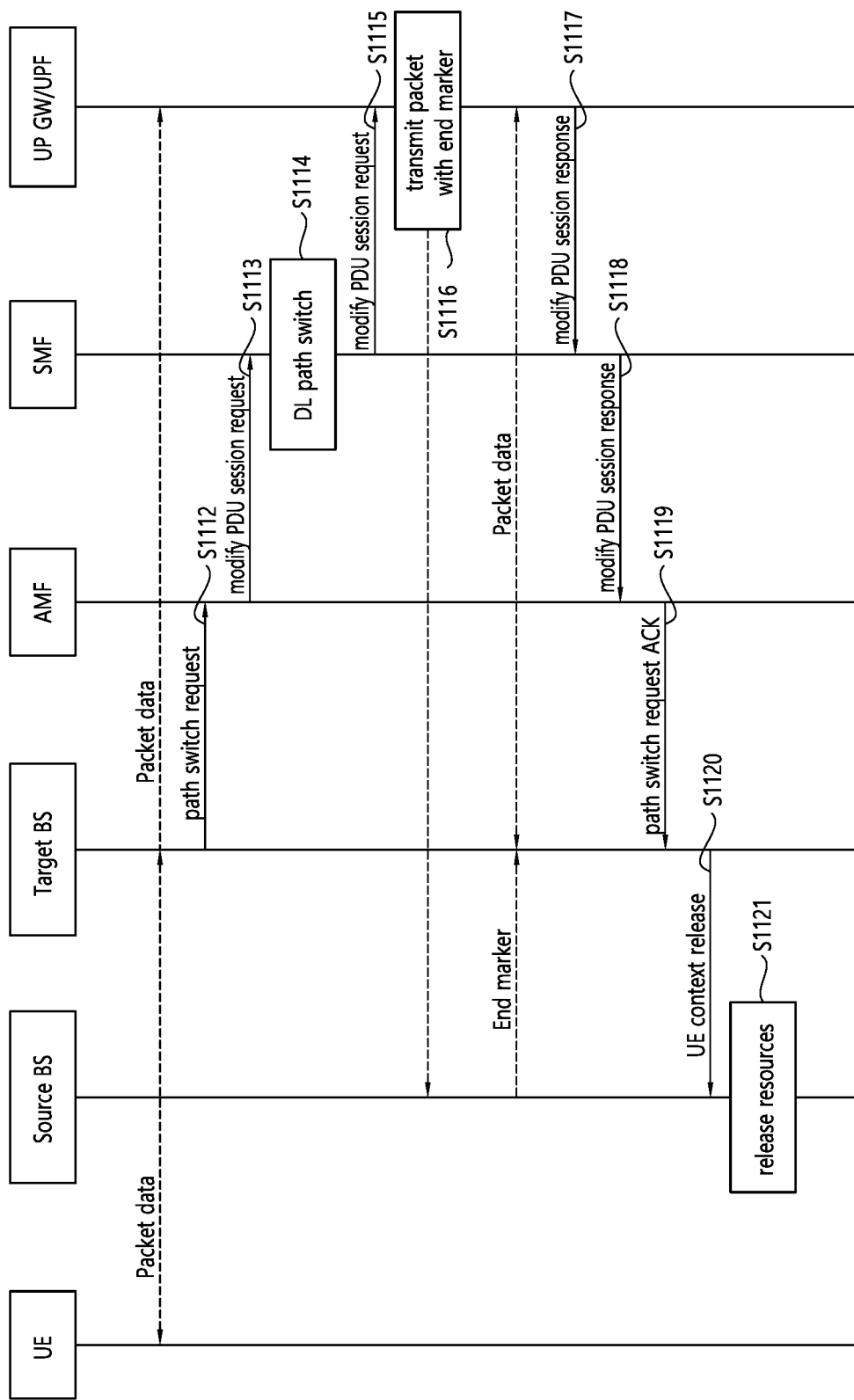

FIGS. 11A and 11B show a procedure for forwarding a QoS flow-to-DRB mapping rule in a handover procedure according to an embodiment of the present invention.

According to the proposed procedure, when the handover of a UE is performed between neighboring BSs having an Xn interface, a source BS may notify a target BS of a QoS flow-to-DRB mapping rule of the source BS. Here, it is assumed that a QoS flow arriving at any BS needs to pass an SDAP layer that performs QoS flow-to-DRB mapping, the source BS and the target BS may have different QoS flow-to-DRB mapping rules, and a packet passing the SDAP layer needs to be forwarded to the target BS.

Referring to FIG. 11A, in step S1101, the source BS may configure a UE measurement procedure. A measurement control message may be transmitted from the source BS to a UE. The source BS may be a gNB or an enhanced eNB.

In step S1102, a measurement report message may be triggered and may be transmitted to the source BS.

In step S1103, upon receiving the measurement report message, the source BS may determine the handover of the UE on the basis of a measurement report and RRM information.

In step S1104, the source BS may transmit a handover request message to the target BS so that the target BS prepares for the handover. The target BS may be a gNB or an enhanced eNB.

In step S1105, upon receiving the handover request message from the source BS, the target BS may perform admission control and may configure a required resource on the basis of received E-RAB QoS information.

In step S1106, the target BS may transmit a handover request ACK message to the source BS in response to the handover request message.

In step S1107, upon receiving the handover request ACK message from the target BS, the source BS may generate an RRC connection reconfiguration message including a transparent container to be transmitted to the UE as an RRC message in order to perform the handover. When the RRC connection reconfiguration message is received, the UE may perform make-before-break handover without connection release until establishing RRC connection with the target BS or may perform normal handover which releases RRC connection with the source gNB.

In step S1108, the source BS may buffer uplink data to be transmitted to a core network and downlink data to be transmitted to the UE. When the source BS supports make-before-break handover, the source BS may transmit downlink data to the UE or may receive uplink data to be transmitted to the core network.

In step S1109, the source BS may transmit an SN status transfer message including the QoS flow-to-DRB mapping rule of the source BS to the target BS. Alternatively, in order to provide the QoS flow-to-DRB mapping rule of the source BS to the target BS, a new message may be used and may be transmitted before data forwarding.

In step S1110, upon receiving the SN status transfer message or the new message, the target BS may remap a forwarded packet on the basis of the QoS flow-to-DRB mapping rules of the source BS and the target BS. That is, for the forwarded packet, the target BS may perform DRB-to-QoS mapping according to the QoS flow-to-DRB mapping rule of the source BS. Thereafter, the target BS may perform QoS flow-to-DRB mapping according to the same mapping rule. The target BS may buffer the remapped packet.

In step S1111, when the UE successfully accesses the target BS, the UE may transmit an RRC connection reconfiguration complete message to the target BS to confirm the handover. Upon receiving the RRC connection reconfiguration complete message, the target BS may start sending the buffered packet to the UE.

Referring to FIG. 11B, in step S1112, the target BS may transmit a downlink path switch request message including a downlink TEID to an AMF. The downlink TEID may be allocated to indicate that the UE has changed the BS.

In step S1113, upon receiving the downlink path switch request message from the target BS, the AMF may determine that an SMF can continue to serve the UE. Then, the AMF may transmit a modify PDU session request message including a downlink TEID to the target SM to the SMF in order to request a downlink path switch to the target BS.

In step S1114, upon receiving the modify PDU session request message from the AMF, the SMF may determine to switch a downlink path toward the target BS. Then, the SMF may select an appropriate UPGW or UPF that transmits a downlink packet to the target BS.

In step S1115, the SMF may send the modify PDU session request message including the downlink TEID to the selected UPGW or UPF in order to release any user plane/ TNL resources towards the source BS.

In step S1116, upon receiving the modify PDU session request message, the UPGW or UPF may transmit one or more "end marker" packets on an old path to the source BS. The UPGW or UPF may then release any user plane/TNL resources towards the source BS.

In step S1117, the UPGW or UPF may send a modify PDU session response message to the SMF.

In step S1118, upon receiving the modify PDU session response message from the UPGW or the UPF, the SMF may transmit the modify PDU session response message to the AMF.

In step S1119, upon receiving the modify PDU session response message from the SMF, the AMF may transmit a path switch request ACK message to the target BS to report that the downlink path switch to the target BS is completed.

In step S1120, upon receiving the path switch request ACK message from the AMF, the target BS may transmit a UE context release message to the source BS in order to indicate the success of the handover success and to initiate the release of resources by the source BS.

In step S1121, upon receiving the UE context release message from the target BS, the source BS may release radio and control plane-related resources associated with UE context.

A packet to which the QoS flow-to-DRB mapping rule of the source BS is applied can be forwarded to the target BS and can be transmitted directly to the UE without any additional process for avoiding packet loss during data forwarding at the source BS side. According to the proposed embodiment of the present invention, it is possible to improve UE's experience, such as smooth handover, and to facilitate an RAN node to handle data packets better for a specific UE during a handover.

Figure 12B:
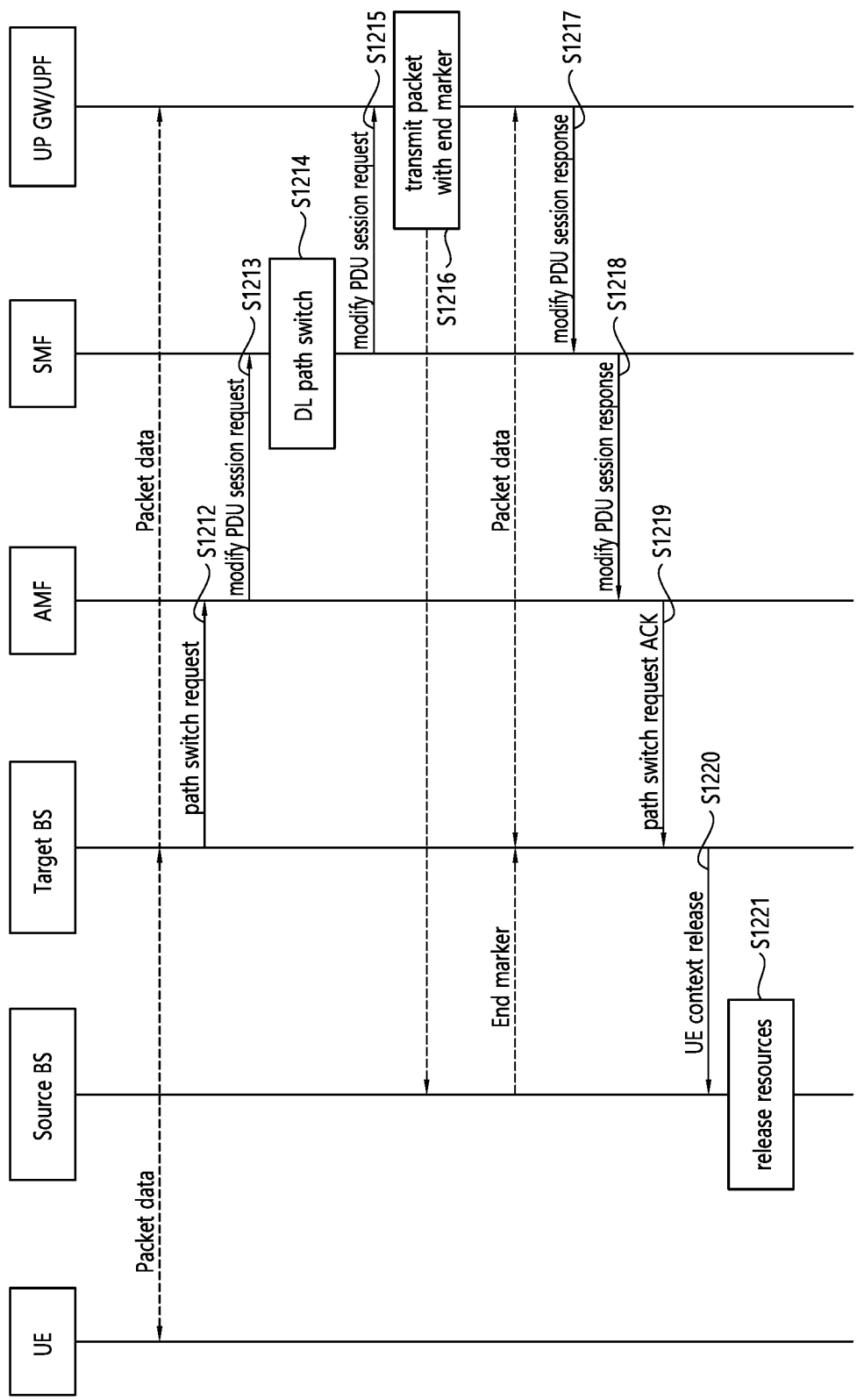

FIGS. 12A and 12B show a procedure for forwarding a QoS flow packet in a handover procedure according to an embodiment of the present invention.

According to the proposed procedure, when the handover of a UE is performed between neighboring BSs having an Xn interface, a source BS may buffer a specific QoS flow packet. The specific QoS flow packet may be a packet received from a UPGW or a UPF before QoS flow-to-DRB mapping is applied. The specific QoS flow packet may be a packet which is obtained by applying QoS flow-to-DRB mapping to a packet that has passed through an SDAP layer but is not yet transmitted to a UE. The specific QoS flow packet may be a packet which is obtained by applying QoS flow-to-DRB mapping to a packet received from a UE. The source BS may forward the buffered specific QoS flow packet to a target BS. Here, it is assumed that a QoS flow arriving at any BS needs to pass an SDAP layer that performs QoS flow-to-DRB mapping, the source BS and the target BS may have different QoS flow-to-DRB mapping rules, and a packet passing the SDAP layer needs to be forwarded to the target BS.

Referring to FIG. 12A, in step S1201, the source BS may configure a UE measurement procedure. A measurement control message may be transmitted from the source BS to a UE. The source BS may be a gNB or an enhanced eNB.

In step S1202, a measurement report message may be triggered and may be transmitted to the source BS.

In step S1203, upon receiving the measurement report message, the source BS may determine the handover of the UE on the basis of a measurement report and RRM information.

In step S1204, the source BS may transmit a handover request message to the target BS so that the target BS prepares for the handover. The target BS may be a gNB or an enhanced eNB.

In step S1205, upon receiving the handover request message from the source BS, the target BS may perform admission control and may configure a required resource on the basis of received E-RAB QoS information.

In step S1206, the target BS may transmit a handover request ACK message to the source BS in response to the handover request message.

In step S1207, upon receiving the handover request ACK message from the target BS, the source BS may generate an RRC connection reconfiguration message including a transparent container to be transmitted to the UE as an RRC message in order to perform the handover. When the RRC connection reconfiguration message is received, the UE may perform make-before-break handover without connection release until establishing RRC connection with the target BS or may perform normal handover which releases RRC connection with the source gNB.

In step S1208, the source BS may buffer a specific QoS flow packet.

The specific QoS flow packet may be a packet received from a UPGW or a UPF before QoS flow-to-DRB mapping is applied. The specific QoS flow packet may be a packet which is obtained by applying QoS flow-to-DRB mapping to a packet that has passed through the SDAP layer but is not yet transmitted to a UE. The specific QoS flow packet may be a packet which is obtained by applying QoS flow-to-DRB mapping to a packet received from a UE. When the source BS supports make-before-break handover, the source BS may transmit downlink data which has passed the SDAP layer to the UE or may receive uplink data to be transmitted to the core network.

In step S1209, the source BS may transmit an SN status transfer message to the target BS. Also, the source BS may forward the specific QoS flow packet to the target BS.

In step S1210, after receiving the SN status transfer message, the target BS may buffer the specific QoS flow packet forwarded from the source BS.

In step S1211, when the UE successfully accesses the target BS, the UE may transmit an RRC connection reconfiguration complete message to the target BS to confirm the handover. Upon receiving the RRC connection reconfiguration complete message, the target BS may start sending the buffered packet to the UE using the QoS flow-to-DRB mapping rule of the target BS.

Referring to FIG. 12B, in step S1212, the target BS may transmit a downlink path switch request message including a downlink TEID to an AMF. The downlink TEID may be allocated to indicate that the UE has changed the BS.

In step S1213, upon receiving the downlink path switch request message from the target BS, the AMF may determine that an SMF can continue to serve the UE. Then, the AMF may transmit a modify PDU session request message including a downlink TEID to the target SM to the SMF in order to request a downlink path switch to the target BS.

In step S1214, upon receiving the modify PDU session request message from the AMF, the SMF may determine to switch a downlink path toward the target BS. Then, the SMF may select an appropriate UPGW or UPF that transmits a downlink packet to the target BS.

In step S1215, the SMF may send the modify PDU session request message including the downlink TEID to the selected UPGW or UPF in order to release any user plane/ TNL resources towards the source BS.

In step S1216, upon receiving the modify PDU session request message, the UPGW or UPF may transmit one or more "end marker" packets on an old path to the source BS. The UPGW or UPF may then release any user plane/TNL resources towards the source BS.

In step S1217, the UPGW or UPF may send a modify PDU session response message to the SMF.

In step S1218, upon receiving the modify PDU session response message from the UPGW or the UPF, the SMF may transmit the modify PDU session response message to the AMF.

In step S1219, upon receiving the modify PDU session response message from the SMF, the AMF may transmit a path switch request ACK message to the target BS to report that the downlink path switch to the target BS is completed.

In step S1220, upon receiving the path switch request ACK message from the AMF, the target BS may transmit a UE context release message to the source BS in order to indicate the success of the handover success and to initiate the release of resources by the source BS.

In step S1221, upon receiving the UE context release message from the target BS, the source BS may release radio and control plane-related resources associated with UE context.

Since a QoS flow packet to which the QoS flow-to-DRB mapping rule is not applied may be forwarded to the target BS via the Xn interface, it may be necessary to provide the target BS with additional information via a packet header or signaling. According to the proposed embodiment of the present invention, it is possible to improve UE's experience, such as smooth handover, and to facilitate an RAN node to handle data packets better for a specific UE during a handover.

For the convenience of description, it has been shown above only that a QoS flow-to-DRB mapping rule is forwarded in an Xn handover procedure, but the present invention is not limited thereto. A QoS flow-to-DRB mapping rule may also be forwarded in a handover procedure using a new control plane interface between a 5G core CP node and a BS. In this case, a QoS flow-to-DRB mapping rule transmitted by a source BS may be forwarded to a target BS via the 5G core CP.

Figure 13:
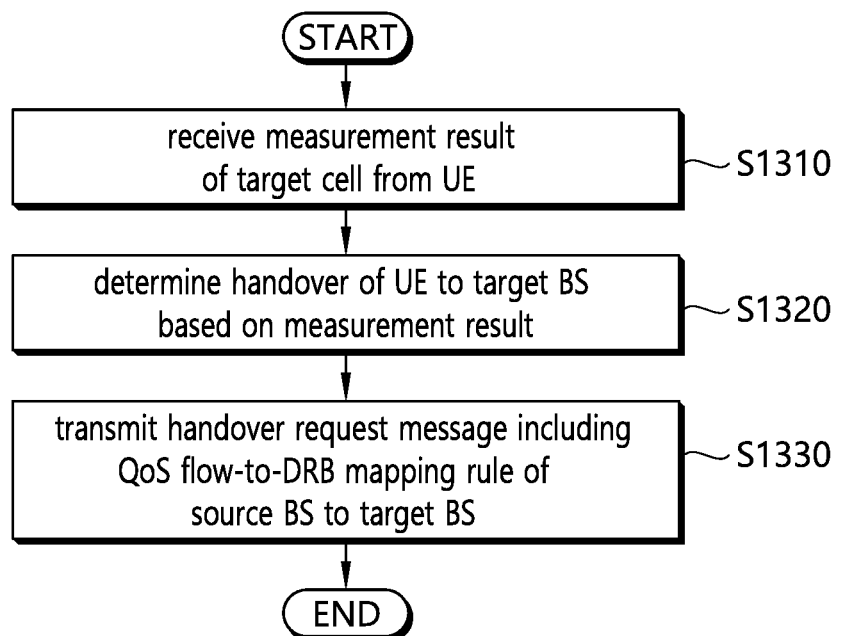
FIG. 13 is a block diagram illustrating a method in which a source BS transmits a QoS flow-to-DRB mapping rule to a target BS according to an embodiment of the present invention.

FIG. 13 is a block diagram illustrating a method in which a source BS transmits a QoS flow-to-DRB mapping rule to a target BS according to an embodiment of the present invention.

Referring to FIG. 13, in step S1310, the source BS may receive a measurement result of a target cell from a UE.

In step S1320, the source BS may determine the handover of the UE to the target BS on the basis of the measurement result.

In step S1330, the source BS may transmit a handover request message including a QoS flow-to-DRB mapping rule of the source BS to the target BS. The QoS flow-to-DRB mapping rule may be a rule used for the source BS to map a specific QoS flow to a specific DRB. When the handover request message including the QoS flow-to-DRB mapping rule is transmitted to the target BS, the QoS flow-to-DRB mapping rule may be used for the target BS to map a QoS flow to a DRB.

Additionally, the source BS may receive, from the target BS, an indication that indicates whether the QoS flow-to-DRB mapping rule included in the handover request message is used for the target BS. Furthermore, the source BS may control data forwarding from the source BS to the target BS on the basis of the received indication. The handover to the target BS may be determined on the basis of the received indication.

The QoS flow may include a QoS profile.

Figure 14:
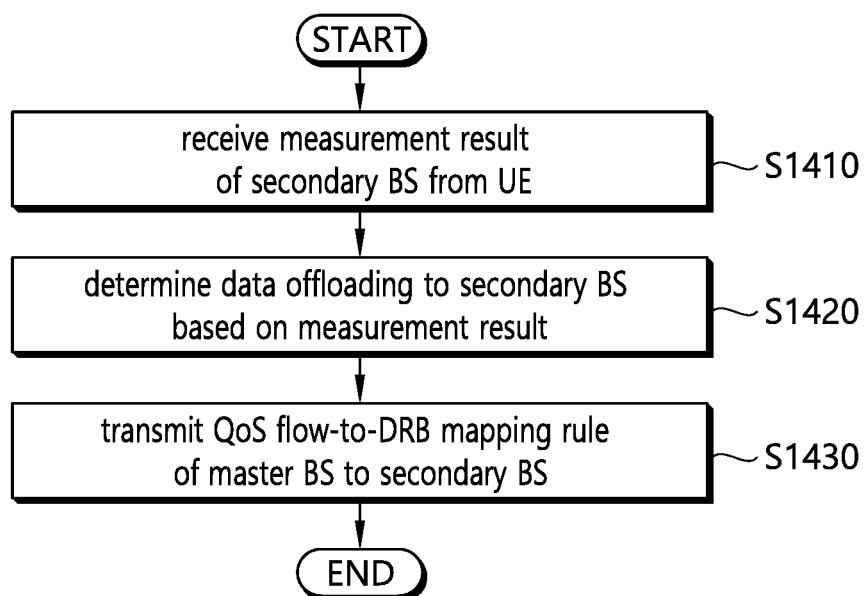
FIG. 14 is a block diagram illustrating a method in which a master BS transmits a QoS flow-to-DRB mapping rule to a secondary BS according to an embodiment of the present invention.

FIG. 14 is a block diagram illustrating a method in which a master BS transmits a QoS flow-to-DRB mapping rule to a secondary BS according to an embodiment of the present invention.

Referring to FIG. 14, in step S1410, the master BS may receive a measurement result of the secondary BS from the UE.

In step S1420, the master BS may determine data offloading to the secondary BS on the basis of the measurement result.

In step S1430, the master BS may transmit a QoS flow-to-DRB mapping rule of the master BS to the secondary BS. The QoS flow-to-DRB mapping rule may be a rule used for the master BS to map a specific QoS flow to a specific DRB. When the QoS flow-to-DRB mapping rule is transmitted to the secondary BS, the QoS flow-to-DRB mapping rule may be used for the secondary BS to map a QoS flow to a DRB.

Additionally, the master BS may receive, from the secondary BS, an indication that indicates whether the QoS flow-to-DRB mapping rule is used for the secondary BS. Furthermore, the master BS may control data forwarding from the master BS to the secondary BS on the basis of the received indication. Data offloading to the secondary BS may be determined on the basis of the received indication.

The QoS flow-to-DRB mapping rule may be included in a secondary node addition request message or a secondary node modification request message.

Figure 15:
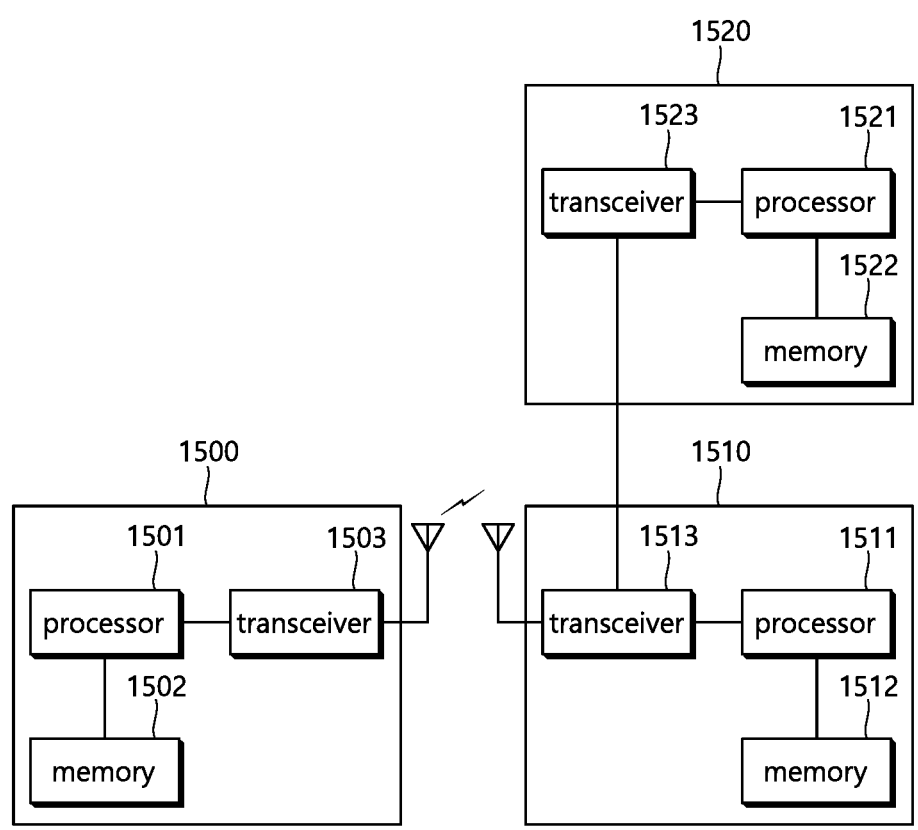
FIG. 15 is a block diagram illustrating a wireless communication system according to the embodiment of the present invention.

FIG. 15 is a block diagram illustrating a wireless communication system according to the embodiment of the present invention.

A UE 1500 includes a processor 1501, a memory 1502 and a transceiver 1503. The memory 1502 is connected to the processor 1501, and stores various information for driving the processor 1501. The transceiver 1503 is connected to the processor 1501, and transmits and/or receives radio signals. The processor 1501 implements proposed functions, processes and/or methods. In the above embodiment, an operation of the UE may be implemented by the processor 1501.

A BS 1510 includes a processor 1511, a memory 1512 and a transceiver 1513. The memory 1512 is connected to the processor 1511, and stores various information for driving the processor 1511. The transceiver 1513 is connected to the processor 1511, and transmits and/or receives radio signals. The processor 1511 implements proposed functions, processes and/or methods. In the above embodiment, an operation of the BS may be implemented by the processor 1511.

An AMF 1520 includes a processor 1521, a memory 1522 and a transceiver 1523. The memory 1522 is connected to the processor 1521, and stores various information for driving the processor 1521. The transceiver 1523 is connected to the processor 1521, and transmits and/or receives radio signals. The processor 1521 implements proposed functions, processes and/or methods. In the above embodiment, an operation of the AMF may be implemented by the processor 1521.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

The invention claimed is:

1. A method performed by a target base station operating in a wireless communication system, the method comprising:
    receiving, from a source base station, a handover request message including information related to a quality of service (QoS) flow-to-data radio bearer (DRB) mapping of the source base station;
    deciding to use the QoS flow-to-DRB mapping of the source base station at the target base station; and
    transmitting, to the source base station, a handover request acknowledge message as a response to the handover request message, wherein the handover request acknowledge message includes information related to using the QoS flow-to-DRB mapping of the source base station at the target base station.

2. The method of claim 1, wherein the QoS flow-to-DRB mapping includes mapping a DRB to one or more QoSs.

3. The method of claim 1, wherein a QoS flow includes a QoS profile.

4. A method performed by a wireless device operating in a wireless communication system, the method comprising:
    communicating with a source base station using a quality of service (QoS) flow-to-data radio bearer (DRB) mapping of the source base station;
    transmitting, to the source base station, a measurement report for a measurement result of a target cell;
    receiving, from the source base station, a handover command informing the device of a handover from the source base station to a target base station serving the target cell;
    accessing the target cell; and
    communicating with the target base station using the QoS flow-to-DRB mapping of the source base station.

5. The method of claim 4, wherein the QoS flow-to-DRB mapping includes mapping a DRB to one or more QoSs.

6. The method of claim 4, wherein a QoS flow includes a QoS profile.

7. A wireless device operating in a wireless communication system, the wireless device comprising:
    at least one transceiver;
    at least processor; and
    at least one computer memory operably connectable to the at least one processor and storing instructions that, based on being executed by the at least one processor, perform operations comprising:
    communicating with a source base station using a quality of service (QoS) flow-to-data radio bearer (DRB) mapping of the source base station;
    transmitting, to the source base station, a measurement report for a measurement result of a target cell;
    receiving, from the source base station, a handover command informing the device of a handover from the source base station to a target base station serving the target cell;
    accessing the target cell; and
    communicating with the target base station using the QoS flow-to-DRB mapping of the source base station.

8. The wireless device of claim 7, wherein the QoS flow-to-DRB mapping includes mapping a DRB to one or more QoSs.

9. The wireless device of claim 7, wherein a QoS flow includes a QoS profile.

* * * * *